INVENTOR.
RALPH D. COLLINS
BY Neil R. Graham
ATTORNEYS

May 22, 1962 R. D. COLLINS 3,036,159

TELEPHONE IDENTIFICATION SYSTEM

Filed June 24, 1954 2 Sheets-Sheet 2

INVENTOR.
RALPH D. COLLINS
BY Ivel R. Goshaw
ATTORNEY

United States Patent Office 3,036,159

Patented May 22, 1962

3,036,159

TELEPHONE IDENTIFICATION SYSTEM

Ralph D. Collins, 141 S. Almont Drive, Beverly Hills, Calif.

Filed June 24, 1954, Ser. No. 439,007
31 Claims. (Cl. 179—17)

This invention relates to communication apparatus, such as telephones, and particularly to a telephone subscriber identification system whereby the calling subscriber's subset will be identified at a central station.

The use of different systems for identifying subscribers' subsets are known, as evidenced by U.S. Patents No. 2,672,518 and No. 2,387,897, a vibrator unit for generating identifying signal tones being shown in U.S. Patent No. 2,254,378. The present invention is an improvement and has several advantages over prior identification systems. First, when the operator uses manual identification, it is not positive, is costly, and is subject to wrong numbers. Other systems, such as a non-coded grounded system, are limited to two-party identification, are subject to bad ground connections, and require poling. The coded ground systems are also subject to bad ground conditions, are not of universal application, require more elaborate test equipment, and a de-centralized test center.

The system of this invention requires no grounds, there is no practical limitation to the number of parties, it will operate with all present-day line equipment and over conventional line facilities, will provide positive identification for individual and party lines, requires no mechanical adjustment beyond normal maintenance, will permit centralized testing, and requires no poling. One modification described hereinafter utilizes a transistor oscillator tuned to a specific frequency, while another modification requires solely a tuned circuit which is shock-excited to provide the identification frequency in the form of a damped wave. It is obvious that such additional equipment at the subscriber's station may be extremely compact and may be accommodated in the present-day subset housing.

The principal object of the invention, therefore, is to facilitate the identification of subscribers' stations, or subsets, of a telephone system.

Another object of the invention is to provide an improved system of identification of telephone subscribers' stations or subsets.

A further object of the invention is to provide improved systems of generating identification signals at a telephone subscriber's station or subset.

The novel features which are believed to be characteristic of this invention, both as to the manner of its organization and the mode of its operation, will be better understood from the following description, when read in conjunction with the accompanying drawings, in which.

Figure 1:
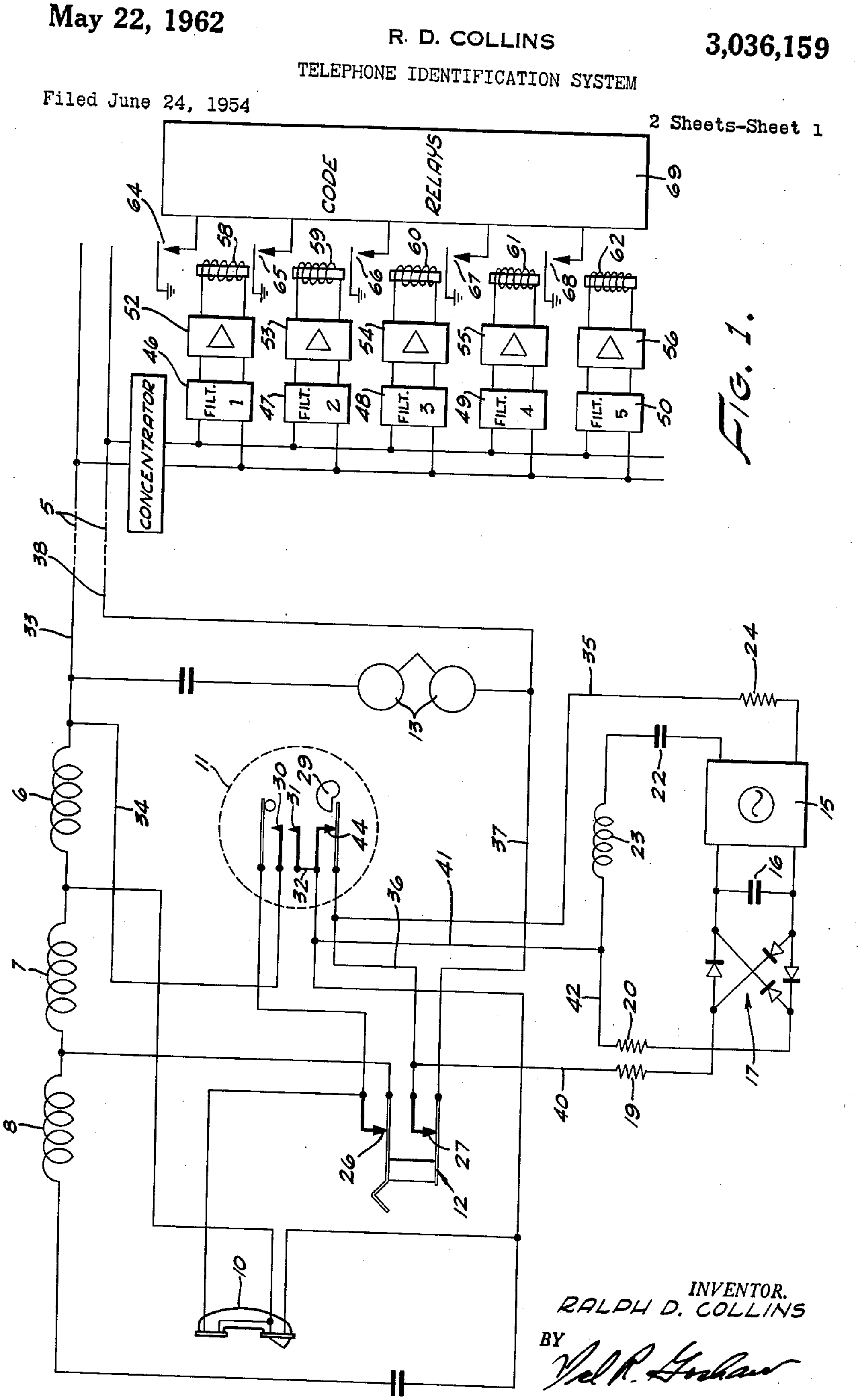
FIG. 1 is a combination schematic and diagrammatic drawing of a system embodying the invention.

Referring now to the drawings, particularly FIG. 1, a subscriber's station or subset is shown to the left of the broken lines 5, indicating various lengths of separation between the subset and the central station equipment, a portion of which is shown to the right of the broken lines 5. The subset includes a standard induction coil having three sections, 6, 7, and 8, a standard transmitter-receiver unit 10, a standard dialing unit shown within the broken line circle 11, a standard hook switch 12, and a standard bell ringer 13. The addition to this standard subset is an oscillator unit 15 using transistors, along with a filter condenser 16, a rectifying unit 17, current limiting resistors 19 and 20, a low impedance output path including a condenser 22, an inductance 23, and a load resistor 24.

As explained above, the purpose of the invention is to generate a signal at a telephone subset for transmitting to a telephone central office which will identify the subset. The signal is generated by the oscillator 15 when energized by the normal action of a calling subscriber and is tuned to a certain predetermined frequency, each subset on a party line being tuned to a different frequency. When a subscriber removes the unit 10 from the hook switch 12, contacts 26 and 27 are made. Now, when the dial is actuated to call a number, a cam 29 is rotated to open contacts 44 and contacts 30 and 31 are closed. Contacts 30 and 31 are known as shunting or off-normal contacts, and contacts 44 are pulsing contacts, contacts 30 and 31 remaining closed during the rotation of cam 29. Thus, a direct current potential is impressed on the oscillator 15 from the central office when contacts 44 are opened.

The D.C. energizing circuit to the oscillator from the central office is over line conductor 33, conductor 34, over closed contacts 31, conductors 32, 41, and 42, through current limiting resistance 20 to rectifier 17, and from line conductor 38, over conductor 37, closed switch hook contacts 27, conductor 40, current limiting resistance 19, to the other side of rectifier 17. This places the proper polarity on the transistor oscillator 15 regardless of the polarity of line conductors 33 and 38.

The output circuit of the oscillator 15 is over resistor 24, conductor 35, conductor 36, closed switch hook contacts 27, conductor 37 to line conductor 38. The other output portion of this circuit is over condenser 22, inductance 23, conductor 41, conductor 32, closed contacts 31, conductor 34, to line conductor 33. However, since dialing contacts 44 short circuit the output conductors 35 and 41, the generated tone will only be impressed on line conductors 33 and 38 when contacts 44 are open.

At the central office are a plurality of filters, five being shown to illustrate a five-party line, these filters being shown at 46, 47, 48, 49, and 50. The output of each filter is connected to respective amplifier-rectifier units 52, 53, 54, 55, and 56, the outputs of which actuate respective relays 58, 59, 60, 61, and 62, having normally open contacts 64, 65, 66, 67, and 68. The contacts just mentioned are connected to a conventional type of relay code identification unit 69, now in use, and which functions to provide identification data in some types of telephone systems. Connected between the conductors 33 and 38 and the filters 46 and 50 is a concentrator now in use which permits multiple use of central office equipment for indicating party lines.

As mentioned above, the transistor oscillator may be of very small size, suitable for inclusion within a subset casing, and since an alternating current tone is generated in the loop, no grounds are required, poling is unnecessary, and the unit will operate with present-day line equipment from inter-office trunks. Since transistor oscillators require no mechanical adjustments, only normal maintenance is required, and by the use of comparatively high frequencies of alternating current, positive identification for individual and party lines is provided. It is to be understood, of course, that the identification tone frequencies may be within the normal voice frequency band, inasmuch as they are transmitted only during the dialing operation when the dialing contacts 44 are broken, contacts 30 and 31 being maintained closed during the dialing operation. When the dialing is completed, contacts 44 are closed, which short circuits the output of oscillator 15 during conversation. When the unit 10 is replaced on switch hook 12, contacts 27 are broken and the oscillator 15 is de-energized.

Figures 2, 3, 4:
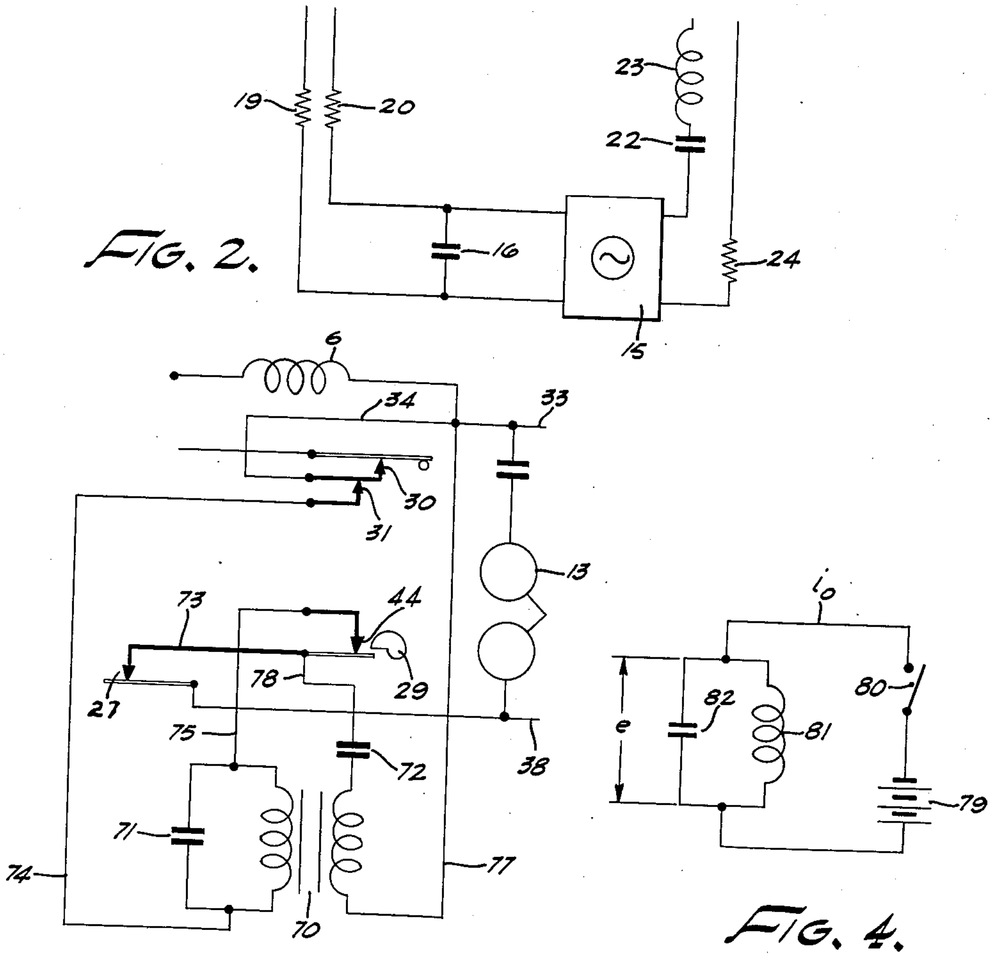
FIG. 2 is a detail view of a modification of the tone generator shown in FIG. 1.
FIG. 3 is a schematic view of a second modification of the invention.
FIG. 4 is a schematic view illustrating the operation of the modification shown in FIG. 3.

A modification of the oscillator is shown in FIG. 2, this modification eliminating the rectifier unit 17, which is possible when a definite polarity is always impressed on line conductors 33 and 38.

Figure 5:
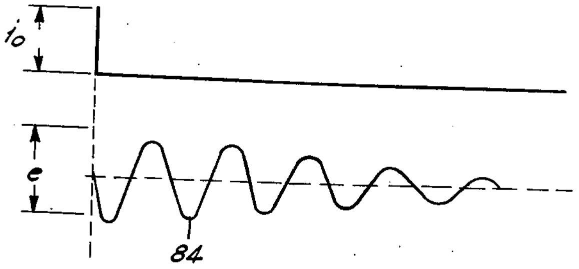
FIG. 5 is a graph showing the operation of the modification shown in FIG. 3.

Referring now to FIGS. 3, 4, and 5, the same contacts 30, 31, and 44 are illustrated, but this dialing unit has no conductor 32 between contacts 31 and 44, as shown in FIG. 1. This unit utilizes a shock-excited oscillator, comprising a transformer 70 having its primary shunted by condenser 71 to form a tuned circuit, and a condenser 72 in series with its secondary. The transformer is of the high "Q" type to obtain a longer duration of the damped wave.

The operation of this unit is such that when the switch hook contacts 27 are closed and the dialing operation begun, the closing of contacts 30 and 31, contacts 44 being closed, causes a direct current to flow through the primary winding of transformer 70, which forms part of the tuned circuit. The circuit for this current is from line conductor 33, conductor 34, closed contacts 31, conductor 74, through the tuned circuit, over conductor 75, closed contacts 44, conductor 73, closed contact 27, to line conductor 38. However, upon each break of the contacts 44 during the dialing operation, a damped wave of several cycles, such as shown at 84 in FIG. 5, is transmitted over the secondary winding of transformer 70 to line conductors 33 and 38 over conductor 77, condenser 72, conductor 78, conductor 73, and closed contacts 27. Also, if contacts 31 are broken, a damped wave will be transmitted in the same manner.

To explain the operation of this modification of the invention, reference is made to FIGS. 4 and 5, FIG. 4 showing a battery source 79 in circuit with a switch 80, and an inductance 81 in parallel with a condenser 82. It is well known that closing the switch 80 will cause a current $i_0$ to flow through the inductance 81, the relationship between this current $i_0$ and alternating current voltage $e$ is shown in the graph in FIG. 5. Now, upon the opening of switch 80, the energy in coil 81 will charge condenser 82, which energy will then be discharged through coil 81, and a damped wave train, such as shown at 84 in FIG. 5, will result. The tuning of the primary of transformer 70 and condenser 71 will provide any desired frequency of the damped wave.

Thus, without any generating oscillator, such as shown at 15 in FIGS. 1 and 2, a sufficient tone is generated at the subset to provide its identification at the central office. Each tuned circuit at a subset can be tuned to generate a damped wave of a certain frequency different from those frequencies of waves from other subsets which can be separated by the filters shown in FIG. 1. The transformer unit 70 and condensers 71 and 72 occupy a very small space and can thus be easily accommodated within a subscriber's subset. The same oscillator units of the subsets can also be used on telephone system trunk circuits, repeaters, or other telephone system switching elements requiring identification.

I claim:

1. In a telephone subscriber's identification system, the combination of a telephone subset having switch hook contacts, shunting and pulsing contacts, central office equipment including a plurality of filters for separating a currents of different frequencies transmitted thereto, a transistor oscillator located at said subset, and circuit connections between said central station and said oscillator and through said switch hook contacts when closed for impressing a polarizing potential on said oscillator for generating an alternating current tone, and circuit connections through said switch hook contacts and said shunting contacts for transmitting said tone to said central office equipment, said pulsing contacts short circuiting said last mentioned circuit connections when closed, said closed shunting contacts being adapted to remain closed during the dialing operation to continuously impress said polarizing potential on said oscillator.

2. A telephone subscriber's identification system in accordance with claim 1, in which a rectifier unit is connected between said oscillator and said central office equipment for obtaining a certain polarity voltage on said oscillator regardless of the polarity of the voltage of said first mentioned connections.

3. A telephone subscriber's identification system in accordance with claim 1, in which said pulsing contacts intermittently short circuit said last mentioned connections, the output of said oscillator being transmitted to said central equipment when said contacts are open.

4. A telephone identification system comprising central office equipment, a subset having a transmitter-receiver unit, switch hook contacts adapted to be closed on the removal of said transmitter-receiver unit a dialing unit having shunting and pulsing contacts, said shunting contacts being maintained closed during the dialing operation, said pulsing contacts being alternately closed and opened by the dialing operation, a transistor oscilaltor unit, a power source, an energizing circuit for said oscillator unit said closed dialing contacts continuously impressing energy from said power source on said oscillator unit during the dialing operation, said circuit including connections from said energy source through said switch hook closed contacts, and an output circuit for said oscillator, said circuit including said switch hook contacts and one of said dialing contacts, another of said dialing contacts short circuiting said output circuit when said last mentioned contacts are closed.

5. A telephone identification system in accordance with claim 4, in which said central office equipment includes a plurality of filters adapted to select an alternating current generated by said oscillator.

6. A telephone subscriber's identification system comprising a plurality of subsets, central office equipment, a common transmission line between said subsets and said central office equipment, an oscillator at each of said subsets, each of said oscillators being tuned to generate an alternating current of a different frequency, transmitter-receiver units at each of said subsets, switch hooks for said units, said switch hooks having contacts adapted to be closed by the removal of said transmitter-receiver units, circuit connections through said closed contacts for impressing energy from said central office equipment on each of said respective oscillators over said common transmission line, a dialing unit at each of said subsets, each of said dialing units having multiple contacts, one of which is adapted to be opened and closed during the dialing operation, others of which are adapted to remain closed during the dialing operation to continuously impress energy on said oscillator, an output circuit from each of said oscillators through said respective switch hook contacts, transmission of said generated currents occurring during the time said one contact is open, connections between the output circuits of each of said oscillators and said common transmission line, and a plurality of filters in said central office equipment for selecting the current generated by each of said oscillators in accordance with the frequency thereof.

7. A telephone subscriber's identification system in accordance with claim 6, in which said oscillators are transistor oscillators.

8. A telephone subscriber's identification system in accordance with claim 6, in which rectifier bridge units are connected between said oscillators and said central office equipment to provide a predetermined polarity of the energy impressed on said oscillators.

9. A telephone subscriber's identification system comprising a subset including a switch hook having contacts and a dialing unit having pulsing contacts and shunting contacts, a transformer having tuned windings for generating a current of a predetermined frequency, a source of direct current, connections from said source through said shunting contacts of said dialing unit when closed for continuously impressing a voltage on said tuned windings over said closed shunting contacts during the dialing operation, and connections between said windings and said source through said switch hook contacts when closed.

10. A telephone subscriber's identification system comprising a subset having switch hook contacts, a dialing unit having pulsing contacts and shunting contacts, an alternating current generator, a source of direct current for energizing said generator, connections from said source through said shunting contacts when closed for impressing a continuous voltage on said generator over said closed shunting contacts during the dialing operation, and connections from said generator to said first mentioned connections through said switch hook contacts when closed, the current generated by said generator being impressed on said first-mentioned connections when said pulsing contacts are open.

11. A telephone subscriber's identification system in accordance with claim 10, in which said alternating current generator is a transistor oscillator.

12. A telephone subscriber's identification system in accordance with claim 10, in which said alternating current generator is a tuned circuit including transformer windings connected to said first mentioned connections and to said last mentioned connections.

13. A telephone subscriber's identification system comprising a plurality of subsets, central office equipment, a common transmission line between said subsets and said central office equipment, an oscillator at each of said subsets, each of said oscillators being tuned to generate an alternating current of a different frequency, transmitter-receiver units at each of said subsets, switch hooks for said units, said switch hooks having contacts adapted to be closed by the removal of said transmitter-receiver units, circuit connections through said closed contacts for impressing energy from said central office equipment on each of said respective oscillators over said common transmission line, a dialing unit at each of said subsets, each of said dialing units having multiple contacts, one of which is adapted to be opened and closed during the dialing operation, an output circuit from each of said oscillators through said respective switch hook contacts, transmission of said generated currents occurring during the time said one contact is open, connections between the output circuits of each of said oscillators and said common transmission line, and a plurality of filters in said central office equipment for selecting the current generated by each of said oscillators in accordance with the frequency thereof, said oscillators being shock excited oscillators including transformer windings and a condenser.

14. A telephone subscriber's identification system comprising a subset including a switch hook having contacts and a dialing unit having a plurality of contacts, a source of direct current potential, a transformer having windings with a certain inductance, and a condenser for tuning said windings-condenser combination to generate a damped current of a certain frequency when shock excited by said potential, said potential being impressed on said windings-condenser combination through said switch contacts and certain of said plurality of contacts when closed, said generated current of said frequency identifying said subset.

15. A telephone subscriber's identification system in accordance with claim 14, in which said potential is impressed over certain of said plurality of contacts and said damped current is transmitted over said switch contacts when one of said plurality of contacts is open.

16. A telephone identification system comprising central office equipment, a subset having a transmitter-receiver unit, switch hook contacts adapted to be closed on the removal of said transmitter-receiver unit, a dialing unit having a plurality of contacts, all but one of which is maintained closed during the dialing operation, the other one of which is alternately closed and opened by the dialing operation, a shock-excited passive inductance-capacity damped wave oscillator unit, a power source, an energizing circuit for said oscillator unit, said circuit including connections from said energy source through said switch hook closed contacts, and an output circuit for said oscillator, said circuit including said switch hook contacts and one of said closed dialing contacts, said other one of said dialing contacts short circuiting said output circuit when said other one of said dialing contacts is closed.

17. A telephone identification system in accordance with claim 16, in which said central office equipment includes a plurality of filters adapted to select an alternating current generated by said oscillator.

18. A telephone subscriber's identification system comprising a plurality of subsets, central office equipment, a common transmission line between said subsets and said central office equipment, a shock-excited inductance-capacity damped wave oscillator at each of said subsets, each of said oscillators being tuned to generate alternating currents of different frequencies, transmitter-receiver units at each of said subsets, switch hooks for said units, said switch hooks having contacts adapted to be closed by the removal of said transmitter-receiver units, circuit connections through said closed contacts for impressing energy from said central office equipment on each of said respective oscillators over said common transmission line, a dialing unit at each of said subsets, each of said dialing units having multiple contacts, one of which is adapted to be opened and closed during the dialing operation, an output circuit from each of said oscillators through said respective switch hook contacts, transmission of said generated currents occurring during the time said respective dialing contacts are open, connections between the output circuits of each of said oscillators and said common transmission line, and a plurality of filters in said central office equipment for selecting the current generated by each of said oscillators in accordance with the frequency thereof.

19. A telephone subscriber's identification system comprising a subset having switch hook contacts, a dialing unit having multiple dialing contacts, a shock-excited inert inductance-capacity damped wave alternating current generator, a source of direct current, connections from said source through said dialing contacts when closed for impressing a voltage on said generator, and connections from said generator to said first-mentioned connections through said switch hook contacts when closed.

20. A telephone subscriber's identification system comprising a subset having switch hook contacts, a dialing unit having multiple dialing contacts, a shock-excited inert inductance-capacity damped wave alternating current generator, a source of direct current voltage, connections from said source through said switch hook contacts when closed for impressing direct current voltage from said source on said generator, and connections from said generator to said first-mentioned connections through said switch hook contacts when closed for transmitting currents generated by said generator to said first-mentioned connections.

21. A telephone party line subscriber station having dial contacts adapted to be connected for operation across a party line and an oscillator operable at a frequency assigned for identification of said station, means coupling said oscillator output across said dial contacts for transmission of identifying frequency signals only when said dial contacts are opened to transmit direct-current circuit interruption pulses.

22. A telephone party line subscriber station comprising a transmitter, a receiver, dial contacts, a receiver control contact for coupling said transmitter, receiver and dial contacts in circuit with a party line when the receiver control contact is closed, an oscillator operable at a frequency assigned for identification of the subscriber station, a power input circuit for said oscillator coupled to said dial contacts to obtain power from said line when said dial contacts are opened and means coupling the output of said oscillator across said dial contacts for transmission to said party line only when said dial contacts are open for transmission of direct-current circuit interruption signals.

23. In a telephone system, a central office, a plurality of subscriber stations, a party line connecting said subscriber stations to said central office, each of said subscriber stations having a receiver control contact and dial contacts, said dial contacts being coupled in circuit with said control contact across said line, an oscillator adapted to generate a station identifying frequency signal when a direct-current circuit interruption signal is transmitted and means coupling said oscillator across said dial contacts, said central office having a plurality of frequency signal detectors one for each of the identifying frequencies of said stations, means for coupling said detectors to said line and means for applying a source of power to said line.

24. In a telephone system, a party line, a plurality of subscribers' stations connected for operation across said party line, each subscriber's station having dial contacts connected to said party line, an oscillator operable at a frequency identifying each station respectively, means connecting each oscillator across said dial contacts for transmission of said oscillator frequency only when said dial contacts are opened.

25. The system of claim 24, wherein each station is provided with a transmitter-receiver, a receiver control contact in circuit with said dial contacts and said party line, said oscillator having its output coupled across said dial contacts and its power input connected to said receiver control contact.

26. The system of claim 25, wherein said oscillator is provided with coupled resonant circuits connected across said dial contacts.

27. The system of claim 25, wherein the oscillator is a transistor oscillator receiving power over said party line.

28. The system of claim 21, wherein said oscillator includes a transistor, said dial contacts normally providing a short circuit across the output of said oscillator.

29. The system of claim 21, wherein said oscillator includes a transistor, a feedback circuit and a circuit resonant to said identifying frequency.

30. A telephone line subscriber station having dial contacts adapted to be connected for operation across a telephone line, an oscillator operable at a predetermined frequency for identifying said station and means coupling the oscillator across said dial contacts for transmission of the identifying frequency only when said dial contacts are opened to transmit direct-current circuit interruption pulses.

31. A telephone subscriber's identification system comprising a subset having switch hook contacts, a dialing unit having shunting and pulsing contacts, an oscillator operable at a frequency assigned for identification of said subset, a source of direct voltage, connections from said source through said switch hook contacts and said shunting contacts when closed for impressing direct current voltage from said source on said oscillator, and connections from said oscillator to said first-mentioned connections through said switch hook contacts and said shunting contacts when closed for transmitting currents generated by said oscillator to said first-mentioned connections.

References Cited in the file of this patent

UNITED STATES PATENTS

| | | |
|---|---|---|
| 1,864,524 | Bragg | June 28, 1932 |
| 2,228,113 | Hersey | Jan. 7, 1941 |
| 2,281,508 | Lundstrom | Apr. 28, 1942 |
| 2,283,610 | Mohr | May 17, 1942 |
| 2,562,594 | Bielenberg | July 31, 1951 |
| 2,717,279 | Matlack et al. | Sept. 6, 1955 |
| 2,782,259 | Dimond | Feb. 19, 1957 |
| 2,889,410 | Hatton | June 2, 1959 |

FOREIGN PATENTS

| | | |
|---|---|---|
| 777,099 | Great Britain | June 19, 1957 |